US008693670B2

(12) United States Patent
Owens et al.

(10) Patent No.: US 8,693,670 B2
(45) Date of Patent: Apr. 8, 2014

(54) SYNCHRONIZATION OF DATA WITHIN AN ACD SYSTEM

(75) Inventors: Robert Owens, Franklin, TN (US); Andy Arbuckle, Brentwood, TN (US); Terry Owens, Craft, TN (US)

(73) Assignee: Aspect Software, Inc., Chelmsford, MA (US)

( * ) Notice: Subject to any disclaimer, the term of this patent is extended or adjusted under 35 U.S.C. 154(b) by 1409 days.

(21) Appl. No.: 12/114,422

(22) Filed: May 2, 2008

(65) Prior Publication Data

US 2009/0274290 A1 Nov. 5, 2009

(51) Int. Cl.
*H04M 3/00* (2006.01)
*H04M 5/00* (2006.01)

(52) U.S. Cl.
USPC ............. 379/265.02; 379/265.01; 379/265.09

(58) Field of Classification Search
USPC ............. 379/265.01–266.01, 266.02, 266.03, 379/266.04, 266.05, 266.06, 266.07, 379/266.08, 266.09, 266.1
See application file for complete search history.

(56) References Cited

U.S. PATENT DOCUMENTS

| 5,335,268 | A * | 8/1994 | Kelly et al. | 379/112.05 |
| 2007/0036331 | A1 * | 2/2007 | Fitzgerald | 379/265.02 |
| 2008/0288240 | A1 * | 11/2008 | D'Agostini | 704/3 |

* cited by examiner

*Primary Examiner* — Khai N Nguyen
(74) *Attorney, Agent, or Firm* — Husch Blackwell LLP

(57) ABSTRACT

A method and apparatus are provided for synchronizing changes from a plurality of dissimilar automatic contact distributors to an electronic workforce management server. The method includes the steps of determining a type of data received from each of the dissimilar automatic contact distributors and identifying a data criteria for the determined type of data. The method further includes the steps of detecting a difference between the data criteria and data, identifying a correction for the detected difference, reformatting the data based upon the identified correction and saving the reformatted data in a database of the electronic workforce management server.

29 Claims, 1 Drawing Sheet

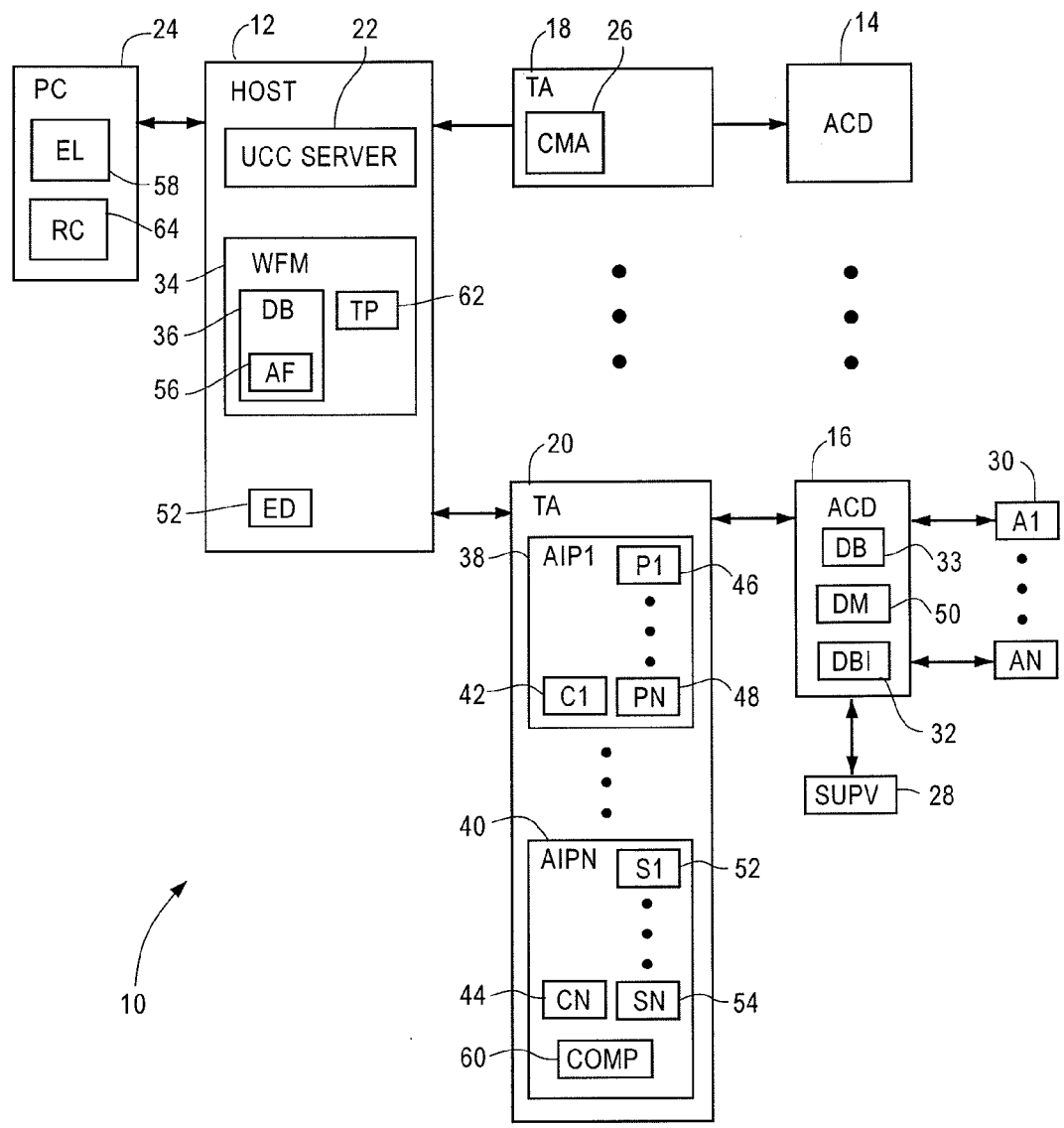

SYNCHRONIZATION OF DATA WITHIN AN ACD SYSTEM

FIELD OF THE INVENTION

The field of the invention relates to communication systems and more particularly to automatic contact distribution systems.

BACKGROUND OF THE INVENTION

The difficulty of providing access to users within interconnected computer systems is generally known. One or more interconnected computers are typically required whenever the task is too large for a single computer or where specific tasks are provided by different independent systems and the activities of the systems must be coordinated.

Automatic call distributors (ACDs) are an example of such a situation. ACDs are typically used by telemarketers and/or service providers to make and receive calls. ACDs are also typically provided with a host computer that controls call processing.

Workforce management, and performance optimization systems (operating in conjunction with an ACD or otherwise) are examples of the different tasks that may operate within a single host or be distributed over a number of hosts. In addition to making and receiving calls, the host of an ACD may also act as a repository of customer records.

In order to reduce telephone costs, telemarketers often locate a number of ACDs of an ACD system near major metropolitan areas. However, during periods of overload, it may be convenient to handle calls through any ACD of the ACD system. In order to ensure adequate staffing, an electronic workforce management (eWFM) located within some common location may analyze the calls handled through each ACD over some time period as a means of estimating future staffing requirements. As a result, the eWFM must have access to call information of each ACD.

While eWFM systems work well, they are often hampered by differences in data formats used by the eWFM and ACDs. Because of the importance of eWFM systems, a need exists for better methods of processing data from the ACDs to the eWFM.

SUMMARY

A method and apparatus are provided for synchronizing changes from a plurality of dissimilar automatic contact distributors to an electronic workforce management server. The method includes the steps of determining a type of data received from each of the dissimilar automatic contact distributors and identifying a data criteria for the determined type of data. The method further includes the steps of detecting a difference between the data criteria and data, identifying a correction for the detected difference, reformatting the data based upon the identified correction and saving the reformatted data in a database of the electronic workforce management server.

BRIEF DESCRIPTION OF THE DRAWINGS

FIG. 1 is a block diagram of a contract distribution system in accordance with an illustrated embodiment of the invention.

DETAILED DESCRIPTION OF AN ILLUSTRATED EMBODIMENT

While call centers work well, they are constantly evolving and, in some cases, require replacement or expansion. When a call center made by a first call center provider must be replaced or expanded, the organization will often consider and may, in fact, purchase a call center from a competitor for use with existing, legacy call centers because of a lower price.

However, the software and operating philosophy used to control call centers may be radically different among call center providers. In order to allow call centers to exchange information, a software adapter or terminal adapter may be needed to allow a first call center to exchange information with a second call center.

Moreover, the information exchanged among call centers may be extensive. For example, agents often possess specialized knowledge that may be needed by clients throughout the call center system even though an agent with specialized knowledge may work at only one call center. In this case, the agent may be shared among the call centers of the call center system.

In order to share agents among call centers, a great deal of information may need to be shared among the call centers. Whenever a shared agent signs into the system, the information must be shared among the call centers. If the agent is assigned to a call, then the other call centers must be notified so that they don't assign another call at the same time.

Other information that may need to be shared among call centers may include an identification of call groups and the skills possessed by each a call group. The identification of call groups and skills possessed by the call group is important in selecting a call group to handle a call.

FIG. 1 is a block diagram of a call center system 10 that addresses these problems shown generally in accordance with an illustrated embodiment of the invention. Included within the call center system is a host 12 for administering operation of a number of dissimilar ACDs 14, 16 of the call center system. While FIG. 1 shows only two ACDs 14, 16, it should be understood that the call center system of FIG. 1 may include any number of ACDs 14, 16. Moreover, the term "dissimilar ACDs" should be understood to mean ACDs that do not share the same command and control structure. For example, a First Point Spectrum ACD made during the late 1990s does not use the same command and control structure as ACDs made by other manufacturers (e.g., Aspect, Avia, Nortel, etc.) made during the same time period.

Under the embodiment illustrated in FIG. 1, the host 12 may include a UCC server 22 coupled to the ACDs 14, 16 through a respective terminal adapter 18, 20. One or more administrative persons (users) working through a terminal 24 may access the server 22 directly, as shown in FIG. 1, or indirectly through the Internet 24. The operation of the ACDs 14, 16 may be controlled through the activities of an administrative user 22 through the server 22 or by a local supervisor 28 located with the ACD 14, 16.

While the ACDs 14, 16 may be different in structure and operation, the use of the terminal adapters 18, 20 may allow the system of FIG. 1 to be operated as if it were one large call center. Moreover, the server 22 may have a different control structure than any of the ACDs 14, 16 where there is very little in common among the ACD 14, 16. This allows the server 22 to operate under a "best of breed" philosophy where the terminal adapters 18, 20 accommodate any differences.

Included within the terminal adapters 18, 20 may be one or more processors 26 that operates at a first level to control processing and/or forwarding of messages based upon a type of the message. Processing may include reformatting messages among a protocol used by the host 12 and a protocol used by the respective ACDs 14, 16. On another level, processing may also include classifying and routing messages by type.

The type of a message may be determined by matching metadata contained within the messages with criteria contained within a message processing table. One or more subroutines may be associated with each message type that may then be used to process the message in accordance with the determined type of message.

The message processor 26 functions as a programmable interface that controls the flow of messages among the different parts of the call center system 10. For example, if an agent is to be shared among more than one ACD 14, 16, then information about the agent, such as sign-in or sign-out would need to be shared among the ACDs 14, 16. However, if an agent were not shared, then any messages about sign-in and sign-out would not be relevant to any of the other ACDs 14, 16 and would simply add to the traffic among the other ACDs 14, 16.

Within each ACD 14, 16, a supervisor working through the supervisor terminal 28 may maintain agent information for the ACD 14, 16. The supervisor 28 may add agents 30 to a ACD DB through a ACD data base interface 32 as they begin employment with the organization that operates the system 10 or delete agents as they depart the organization.

As each change is made, the ACD database interface 32 may enter the change to the ACD database 33 within the ACD 14, 16. The ACD database interface 32 may also forward or provide a means of forwarding a notification of agent change information to an eWFM application 36 within the host 12.

In addition, the supervisor 28 may create and revise agent skills lists within the ACD database 33 within the ACD 14, 16. For example, calls handled by the system 10 may be classified by type of call and by the specific skills required by an agent to handle each type of call.

In addition to creating and revising agent skills lists, the supervisor 28 may also assign agents to agent groups based upon the skills required for handling the type of call assigned to the agent group. Agent groups may be created and revised based upon call campaigns or upon the particular mix of agents available during any work shift.

In general, the UCC server 22 may communicate with the call center applications through a number of database interfaces. In one embodiment, five interface applications may be used. The five are: 1) the WFM application 34 interface 2) a call center management interface; 3) a quality management interface; 4) a directory access protocol (DAP) interface and 5) a reporting database interface. The WFM application 34 interface provides access to a WFM database 36 within the call center system 10. The WFM application 34 operates on a first level to maintain a list of signed-in agents and also to predict a work force (e.g., the number of agents) needed during any one time period based upon historical records and current predictions. The WFM may also monitor call queues of each agent group to determine how long calls remain in queue for the group and other statistics about agent performance. Other statistics available to the UCC server 22 through the WFM application 34 interface may include calls per hour, abandoned calls, average call handling time, identifiers of agent groups and an identifier of each agent assigned to each of the identified agent groups.

The call center management interface provides access to a call management database within each respective ACD 14, 16. The call management database is used by a call management application to maintain a list of agents and the qualification of each agent. The call management application may also be used to select agents to handle calls based upon any appropriate method (e.g., agent idle time, agent skill, etc.). The call management application may also track agent availability.

The quality management interface provides access to a quality management database. The quality management database is used by a quality management application to record calls and other data about call handling by agents.

The directory access protocol interface provides access to a directory access protocol database. The directory access protocol database (not shown) may be accessed by a lightweight directory access protocol (LDAP). The directory access protocol database contains a list of users, passwords and access rights of each user.

The reporting interface provides access to a report database (e.g., viewpoint, datamart, etc). The report databases may collect data regarding any of a number of call center operations (e.g., agent performance, call statistics, etc.). Reporting data may be collected from other interfaces or may be generated independently.

The eWFM application 34 within the host 12 may receive information from one or more of the database interfaces of the ACDs 14, 16 and may function to provide a work schedule for each ACD 14, 16. In this regard, the eWFM server 34 collects statistics from the interfaces regarding calls processed per hour, the types of calls and any other special events such as any outgoing call campaigns and calculates a prediction of call loading over some time period.

Once the eWFM server 34 has predicted a call arrival rate, the eWFM 34 may begin scheduling agents 30 for each work period. To schedule agents 30, the eWFM server 34 may select agents 30 one-at-a-time and assign the agents to agent groups of each ACD 14, 16 based upon the predicted call arrival rate, the call types, the skills required for each call type, upon agent seniority, upon agent preferences or any of a number of these and other factors.

One of the difficulties of ensuring proper operation of the eWFM server 34 has been the difficulty of incorporating changes in agent data from the ACDs 14, 16 into the database of the eWFM application 34. Specifically, for the host 12, the problem is to propagate changes that occurred on ACDs 14, 16 (e.g., the Aspect Call Center) to eWFM server 34. The difficulty accrues from the fact that the scope and meaning of the data may be different within the eWFM database 36 than that used within the ACD database 33 within each of the ACDs 14, 16.

The changes that are of particular interest may be edits to agent information on an ACD 14, 16. For example, if an agent was deleted from ACD1 14 and added to ACD2 16, then this change would be of interest to the eWFM server 34. This change would be forwarded to eWFM application 34 by the ACD database interface 32 and persisted (saved) in a table in the eWFM database (DB) 36.

In the case of agent information, the various fields of the eWFM database 36 and ACD database 33 of the ACDs 14, 16 may include a last name, a first name, a default agent group, a default team, a default class of service (COS), an active flag (i.e., is the agent active or inactive) and a profile number (i.e., a key to profile records associated with an agent. In each case, an information element from the interface 32 may be processed by an agent information processor 38, 40 within a terminal adapter 18, 20 or within the eWFM server 34 to reformat or otherwise reconstruct the data in one of a number of different methods.

Under a first method, an agent information processor 38, 40 may persist (save) the data in the DB 36 without user intervention. In some cases, persisting the data will mean overwriting/modifying some existing data. For example, if agent were to be added to an ACD 14, 16, then the eWFM DB 36 could be modified via an agent data message 50 of a first type sent from the ACD 14, 16 to the eWFM DB 36, without user intervention, to show that the employee has been added to the particular ACD. This may be appropriate where the mapping of the agent to the eWFM employee is known or can be programmatically determined. (For purposes of explanation, a human assigned to an ACD 14, 16 will be referred to as an "agent" while the records of that same human will be referred to as an "employee" within the eWFM application 34.)

Under a second method, a user 24 is prompted to accept the change and then persist the changes in the DB 36. For example, there may be situations where an ACD agent 30 could not be mapped to an eWFM employee with certainty. This is because some ACDs 14, 16 (e.g., an Aspect Call Center) allocates a first predetermined number (e.g., 10) characters for the first name and a second predetermined number (e.g., 12) characters for the last name. On the other hand, the eWFM application 34 may allocate 30 characters each for the first and last names. This situation creates a problem when mapping Aspect Call Center agents to eWFM employees when the agent name was truncated/modified to fit within the Aspect Call Center constraints. On the other hand, the full name may have been used within eWFM, and therefore would not map to the truncated name. If the agent was created using the Aspect Call Center and the employee was created using eWFM, then the system could look for the best match. Once the selection was made, the relationship would be established and the user could accept the changes. After the relationship was established, then subsequent changes could occur automatically as described below.

Under a third method, the user 24 is prompted to add additional information, and persist the original data plus the added data in the DB. For example, an agent file was created on an ACD and that agent does not previously exist within the eWFM 34. Since the eWFM 34 has more data elements (Short Name, Sort Name, Seniority . . . ) than does the ACD 14, 16, the user would need to add the additional data elements before the new employee could be created within eWFM application 34.

Under a fourth method, the user is prompted to take one or more actions based on a set of possible actions. For example, an agent was deleted on the ACD 14, 16. Within eWFM 34, the following actions could be appropriate: 1) mark the employee as inactive within the eWFM 34; 2) delete the employee from the eWFM 34; 3) remove the employees association to the particular ACD instance (in this situation, the employee would typically still be associated to other ACD instances) or 4) some combination of the above.

Under a fifth method, the user is prompted to take action, but the set of actions would be open to any action that the system could perform. For example, an agent's default group membership on an ACD was changed. There are multiple actions that could be appropriate for this situation, and those actions are dependant on how the customer configures the ACDs 14, 16 and eWFM 34. If there is no correlation between ACD groups and eWFM group entities, then no action would be appropriate. If ACD groups can be correlated to eWFM entities, then the user would take action; however, the nature of that action would be dependant on the type of correlation.

The actions taken could be based upon any of a number of factors. Under one method, the action could be based upon configuration data associated with an agent information message sent from the WFM interface 32 to the eWFM application 34. For example, the configuration data may indicate a group or group type. In one case, the configuration data could be used to ignore all messages pertaining to a particular set of groups.

The action taken could be based upon past history of changes recorded within the eWFM database 36. One example of using past history is the mapping of ACD agents to eWFM employees where the changes are further saved to a conversion table. Over time, most agents/employees would be mapped and this would allow more actions to take place automatically without user intervention. Another example would be that if the user(s) always takes no action on a particular type of change, then those changes could automatically be filtered (deleted). Before applying the filter globally, the user would be prompted to confirm that such filtering should be applied. An example might be that for a particular customer, no action would be taken based on Aspect Call Center class of service (COS) changes.

The action could also be based upon the content of the input data. For example, the input data, content of the destination DB, configuration information, and behavioral modifications based on past history all influence the action taken. Additionally, the input stream could select an action. The input stream could indicate that user approval was required.

The action could be based upon the content of the destination database. The first example in the previous paragraph is applicable. That is, the agent information message may contain metadata that indicates that a particular action is to be taken to resolve the uncertainty.

Additionally, the contents of the destination DB could include meta data that specifies whether user intervention would be required before changing the data via the input stream. This could be at an individual employee level or for a particular entity (e.g. Active/Inactive) that transcends all employees.

Each of the five methods and/or variations thereof may be accomplished via the agent information processors 38, 40. The type of data within agent information messages may be identified by metadata contained within the message or by a destination address of the packet. The type of message (data) 50 may be determined by the message processors 26 classifying the message or by operation of a separate classification processor operating within the eWFM application 34.

Each of the information processors 38, 40 may be directed to use with a different type of agent data contained within the agent information message 50. As data is received, a classification processor (either within processor 26 or information processors 38, 40) may classify the data. Once the type of data of the agent information packet 50 has been determined, an information processor 38, 40 may be selected and the packet 50 routed to the selected information processor 38, 40 based upon the classification.

Included within each agent information processor 38, 40 may be an information element criteria file 42, 44 that defines a format required for each of the agent information message types. For example, an agent data packet 50 that adds or deletes an agent of an ACD 14, 16 may include a criteria that defines a minimum set of required data elements and the format of each of those elements. In this case, the required data elements would include identifiers of the agent, the ACD and a group or groups to which the agent is to be added.

A packet 50 of a data type for changing an agent's group assignment may be associated with a criteria that, again defines set of required data elements and the format of each of those data elements. A minimum set of data elements may include an identifier of the agent, the ACD 14, 16, the group to which the agent is to be added and the group from which the agent is to be removed.

A packet 50 of a data type for an agent sign-in or sign-out of an ACD 14, 16 may include a criteria that, again defines set of required data elements and the format of each of those data elements. A minimum set of data elements may include an identifier of the agent and the ACD 14, 16.

Also associated with each of the agent information processors 38, 40 may be a program file 46, 48 that defines one or more sets of processing steps for accomplishing one or more of the method described above. The set of program steps selected may be determined by a comparator 60 based upon a difference between the packet 50 and criteria for that packet. For example, at least one information processor 38, 40 may be directed, in part, to processing name fields from the format of an Aspect call center to the format used by the eWFM application 34. In this example, the eWFM database 36 allows 30 characters in respective fields for a first and last name of an agent and an information message from an ACD 14, 16 may include a message file with only 10 characters per field. In this case, one of the program files 46, 48 would define a process for correcting and reformatting the agent message 50. The process may include comparing the field(s) of the message 50 with the fields of the criteria 42, 44 to detect a difference in characters per field of twenty characters. The detected difference may be used to identify a correction. The correction may include inserting null characters into the name fields. However, this may not be effective if the 10 character limit caused the original name to be truncated. In this case, the criteria may include the additional requirement that at least one null character still exist in each field before additional null characters could be inserted to insure that the name had not been previously truncated.

Alternatively, the correction may include cross-correlating the name characters from the ACDs 14, 16 with the names of employees within an employee data base 52. If the processor 38, 40 should find a full or partial match with an entry in the employee data base, then the processor 38, 40 may calculate a certainty metric describing the probability that the located entry is, in fact, the name. The processor 38, 40 may compare the calculated certainty metric with a threshold value and if the calculated metric exceeds some minimum threshold value then the processor 38, 40 may automatically enter the change into the eWFM database 36.

If the calculated metric does not exceed the minimum threshold resulting in the processor 38, 40 failing to identify a correction for the detected difference, then the processor 38, 40 may present the information from the packet 50 along with any partial matches as one or more proposed solutions in visual form to the user 24 for approval. The presentation of the proposed solutions may be presented to the user 24 in the form of an exceptions list 58 displayed through a rich client 64 or any other appropriate format. Upon selection of one of the proposed solution, the processor 38, 40 complete entry of selected entry into the eWFM database 36.

Under another example, the message 50 may not contain enough information to achieve the intended purpose of the message 50. For example, the intent of the message (as determined from the metadata or destination address of the packet 50) may be to add an agent to a particular ACD 14, 16. The message 50 may be received within the TA 18, 20 or eWFM 34 where the type of message is determined. Within the TA 18, 20, the intent is used to select a processor 38, 40 that handles this type of agent message. The packet 50 is transferred to the selected processor 38, 40 where the content of the packet 50 is compared with the criteria 46, 48 to identify any differences. It should be noted in this regard that if the determination of intent is performed within the eWFM 34, then the criteria 46, 48 may be identified based upon the source ACD 14, 16 of the packet 50.

In either case, the criteria file may indicate that the required data elements may be first and last name, a short name, an identifier of the ACD 14, group identifier and seniority indicator. In this example, if one or more of the required data elements is missing (e.g., the first name), then the processor 38, 40 may again perform a search to locate the missing data element. The search may include the employee data base 52 using the last name and short name as search terms. The processor 38, 40 may also search a set of agent records of the individual ACDs 14, 16 within the database 36 for any other instances of this employee. If a substantial match is found, then the missing data element may be retrieved from the matched file. If the probability is sufficiently high as to exceed some minimum threshold level, then the data message may be automatically reformatted to include the missing data element and saved in the eWFM database 36.

If the probability is not high or any similarly matching files cannot be found, then the agent message 50 may be added to an exceptions list presented to the user 24. The user 24 may review the agent message, add the missing data element, and save the corrected agent message 50 into the eWFM database 36.

In some cases, the criteria 46, 48 may identify a different method for synchronizing changes from the ACDs 14, 16. For example, if the missing data element is not critical to the operation of the system 10, then the automatic reformatting of the agent information may proceed along a number of possible paths.

For example, if the agent message was to add an agent to an ACD and the missing element is an indication of seniority, then the criteria file may add a default level for the missing data element. In this case, the default level may be the lowest seniority level available or possibly a date based seniority designation. Similarly, if the agent message included a unique agent identifier, but not a complete first or last name, then default values of "FIRST NAME" and "LAST NAME" may be substituted.

In another example, if a particular type of error is corrected by a user using a repetitive process, then the correction process may be learned and repeated automatically for similar deficiencies of the same type in later agent messages. In support of this feature, the processors 38, 40 may also create and maintain a tracking file 52, 54 for each correction that was previously displayed within the exception list and approved by the user 24.

A tracking processor 62 may operate in the background comparing entries from the exceptions list with previous entries in the tracking file. If sufficient indicia of repeatability exists (i.e., previous entries within the tracking list have been corrected in the same way), then the tracking processor may perform a number of steps based upon the indicia of repeatability. For example, if the indicia of repeatability indicates that the deficiencies has always been corrected in the same way, then the tracking processor may perform the correction automatically and delete the entry from the exceptions list.

Alternatively, the indicia of repeatability may be compared with a threshold value and if the indicia of repeatability does not exceed the threshold then a proposed correction may be provided to the user within the exceptions list. For example, if the previous incidences of the correction had involved the entry of data from a specific source, then the tracking processor 62 may retrieve that data and present the retrieved data within the corrections list as a proposed change. Alternatively, if the previous entries had involved the deletion of the entry from the exceptions list, then the tracking processor may propose the same solution.

In other examples, in some cases, the criteria 46, 48 would require the prior existence of a valid and complete agent information within the database 36 before an agent message 50 could be processed. In this case, the criteria 46, 48 may include process steps for retrieving the agent file 56 for purposes of validating the agent information in the packet 50. In this case, the agent file 56 is compared with the criteria 42, 44 to ensure that it is complete before the agent information is entered within the database 36. For example, if the agent or ACD identification data within the agent file 56 is different or inconsistent than that of a message 50, then the message 50 and data file 56 may be presented to the user 24 within an exceptions list.

On the other hand, if the user 24 performs the same steps in correcting the exceptions list 58, then the system 10 allows the process to be automated. This may be especially useful in the case of default values within eWFM database 36. For example, the processors 38, 40 may recognize the default values within the agent file 56 and replace the default value with data elements retrieved from the agent information 50.

The eWFM user 24 may be notified that there are pending changes that require user intervention in a number of ways. The notification may be in the form of e-mail and/or via an information message when the user invoked the eWFM rich client.

In the previous examples the source of the changes was the Aspect Call Center or any other form of contact center 14, 16. Other relevant sources of change information could include any of a variety of system interfaces (e.g., Aspect Quality Management, Aspect Data Mart, Aspect Spectrum, Aspect Campaign Management, Aspect Performance Management, etc.). The eWFM 34 is another source that could be used to send change data to the previously mentioned systems. Strictly speaking, a third party equivalent to eWFM may be used within the system 10.

The system 10 offers a number of advantages over prior solutions. For example, in the past, customers would typically handle data exceptions via e-mails sent from ACD system managers to eWFM system managers. The automated approach of the system 10 is a significant improvement because of the fact that a large percentage of the changes can be handled automatically.

A specific embodiment of method and apparatus for entering agent information in a call center has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of synchronizing changes from a plurality of dissimilar automatic contact distributors to an electronic workforce management server comprising:
   determining a type of data for automatic contact distributor change data directed to the workforce management server from each of the dissimilar automatic contact distributors;
   identifying a data test criteria, defining at least a minimum set of data elements and a format, associated with each determined type of data;
   detecting a difference between the data test criteria and the change data;
   identifying a correction for the detected difference by attempting to determine the correction automatically and in response to failure to determine the correction automatically, generating a set of proposed solutions for the detected difference and presenting the set of proposed solutions to a user for selection of the correction for the detected difference;
   reformatting the change data using a set of program steps selected based upon the identified correction; and
   saving the reformatted change data in a workforce management database of the electronic workforce management server.

2. The method of synchronizing changes as in claim 1 further comprising determining the type of data based upon metadata within the change data and presenting the data to a user of the electronic workforce management server along with an identifier of the detected difference when a correction cannot be identified.

3. The method of synchronizing changes as in claim 2 further comprising determining an intent of the change data and utilizing the determined intent in detecting the difference between the data criteria and the change data.

4. The method of synchronizing changes as in claim 1 further comprising calculating a certainty metric for the correction.

5. The method of synchronizing changes as in claim 4 further comprising comparing the certainty metric with a threshold and presenting the correction to a user of the electronic workforce management server where the certainty metric exceeds the threshold.

6. The method of synchronizing changes as in claim 3 further comprising detecting a previous incidence of the administrator correcting the detected difference in the data.

7. The method of synchronizing changes as in claim 6 further comprising saving identifiers of a set of steps performed by the administrator in correcting the identified difference along with an identifier of the data type and detected difference within a tracking file of potential corrections.

8. The method of synchronizing changes as in claim 7 further comprising performing the saved steps and presenting the potential correction to the administrator upon the subsequent occurrence of the data type and difference.

9. The method of synchronizing changes as in claim 8 further comprising searching a database for a correction file corresponding to the data type and detected difference.

10. An apparatus for synchronizing changes from a plurality of dissimilar automatic contact distributors to an electronic workforce management server comprising:
    means for determining a type of data for automatic contact distributor change data directed to the workforce management server from each of the dissimilar automatic contact distributors;
    means for identifying a data test criteria, defining at least a minimum set of data elements and a format, associated with each determined type of data;
    means for detecting a difference between the data test criteria and the change data;
    means for identifying a correction for the detected difference by attempting to determine the correction automatically and in response to failure to determine the correction automatically, generating a set of proposed solutions for the detected difference and presenting the set of proposed solutions to a user for selection of the correction for the detected difference;
    means for reformatting the change data using a set of program steps selected based upon the identified correction; and
    means for saving the reformatted data in a workforce management database of the electronic workforce management server.

11. The apparatus for synchronizing changes as in claim 10 further comprising means for presenting the data to a user of the electronic workforce management server along with an identifier of the detected difference when a correction cannot be identified.

12. The apparatus for synchronizing changes as in claim 11 further comprising means for creating a tracking file for each solution previously presented and selected by the user, and comparing entries from the set of solutions with entries in the tracking file to determine indicia of repeatability which are utilized to automatically identify corrections.

13. The apparatus for synchronizing changes as in claim 10 further comprising means for calculating a certainty metric for the correction.

14. The apparatus for synchronizing changes as in claim 13 further comprising means for comparing the certainty metric with a threshold and presenting the correction to a user of the electronic workforce management server where the certainty metric exceeds the threshold.

15. The apparatus for synchronizing changes as in claim 12 further comprising means for detecting a previous incidence of the administrator correcting the detected difference in the data.

16. The apparatus for synchronizing changes as in claim 15 further comprising means for saving identifiers of a set of steps performed by the administrator in correcting the identified difference along with an identifier of the data type and detected difference within a tracking file of potential corrections.

17. The apparatus for synchronizing changes as in claim 16 further comprising means for performing the saved steps and presenting the potential correction to the administrator upon the subsequent occurrence of the data type and difference.

18. The apparatus for synchronizing changes as in claim 17 further comprising means for searching a database for a correction file corresponding to the data type and detected difference.

19. An apparatus for synchronizing changes from a plurality of dissimilar automatic contact distributors to an electronic workforce management server comprising:
   a classification processor that determines a type of data for automatic contact distributor change data directed to the workforce management server from each of the dissimilar automatic contact distributors;
   a data test criteria that define at least a minimum set of data element and a format associated with each determined type of data;
   a comparator that detects a difference between the data test criteria and the change data;
   an information processor that attempts to determine a correction for the detected difference automatically; and in response to failure to determine the correction automatically, generates a set of proposed solutions for the detected difference and presents the set of proposed solutions to a user for selection of the correction for detected difference And that selects a set of program steps that reformat the data from a plurality of sets of program steps based upon the correction; and
   a workforce management database to which the reformatted data is saved.

20. The apparatus for synchronizing changes as in claim 19 further comprising an exceptions list that presents the data to a user of the electronic workforce management server along with an identifier of the detected difference when a correction cannot be identified.

21. The apparatus for synchronizing changes as in claim 19 further comprising a rich client that presents the exceptions list to the user.

22. The apparatus for synchronizing changes as in claim 20 further comprising an input device that receives a correction from the user.

23. The apparatus for synchronizing changes as in claim 19 further comprising a certainty metric calculated for the correction.

24. The apparatus for synchronizing changes as in claim 23 further comprising a comparator that compares the certainty metric with a threshold and presents the correction to a user of the electronic workforce management server where the certainty metric exceeds the threshold.

25. The apparatus for synchronizing changes as in claim 22 further comprising a tracking file that records previous incidences of the administrator correcting the detected difference in the data.

26. The apparatus for synchronizing changes as in claim 25 further comprising identifiers of a set of steps performed by the administrator in correcting the identified difference saved along with an identifier of the data type and detected difference within the tracking file of potential corrections.

27. The apparatus for synchronizing changes as in claim 26 further comprising a tracking processor that performs the saved steps and presenting the potential correction to the administrator upon the subsequent occurrence of the data type and difference.

28. The apparatus for synchronizing changes as in claim 27 further comprising a database that is searched for a correction file corresponding to the data type and detected difference.

29. The apparatus for synchronizing changes as in claim 27 further comprising an e-mail sent to the administrator by the tracking processor containing the potential correction.

* * * * *

UNITED STATES PATENT AND TRADEMARK OFFICE
CERTIFICATE OF CORRECTION

| | | |
|---|---|---|
| PATENT NO. | : 8,693,670 B2 | Page 1 of 1 |
| APPLICATION NO. | : 12/114422 | |
| DATED | : April 8, 2014 | |
| INVENTOR(S) | : Robert Owens et al. | |

It is certified that error appears in the above-identified patent and that said Letters Patent is hereby corrected as shown below:

Title Page: Item (75)
Please delete inventor "Terry Owens, Craft, TN (US)"; please insert
--Terry Craft, Franklin, TN (US)--.

Signed and Sealed this
Eighth Day of July, 2014

Michelle K. Lee
*Deputy Director of the United States Patent and Trademark Office*